(12) United States Patent
Mielenz et al.

(10) Patent No.: US 10,437,250 B2
(45) Date of Patent: Oct. 8, 2019

(54) METHOD FOR OPERATING A VEHICLE

(71) Applicant: Robert Bosch GmbH, Stuttgart (DE)

(72) Inventors: Holger Mielenz, Ostfildern (DE);
Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/545,571

(22) PCT Filed: Jan. 22, 2016

(86) PCT No.: PCT/EP2016/051330
§ 371 (c)(1),
(2) Date: Jul. 21, 2017

(87) PCT Pub. No.: WO2016/128202
PCT Pub. Date: Aug. 18, 2016

(65) Prior Publication Data
US 2018/0004218 A1    Jan. 4, 2018

(30) Foreign Application Priority Data

Feb. 12, 2015   (DE) ........................ 10 2015 202 468

(51) Int. Cl.
*G05D 1/02* (2006.01)
*B62D 15/02* (2006.01)
*G05D 1/00* (2006.01)

(52) U.S. Cl.
CPC ....... *G05D 1/0225* (2013.01); *B62D 15/0285* (2013.01); *G05D 1/0285* (2013.01); *G05D 1/0088* (2013.01)

(58) Field of Classification Search
CPC ... G05D 1/0225; G05D 1/0285; G05D 1/0088
See application file for complete search history.

(56) References Cited

U.S. PATENT DOCUMENTS

| 2010/0156672 | A1  | 6/2010  | Yoo et al. |
| 2013/0231824 | A1* | 9/2013  | Wilson ................. G05D 1/0246 701/26 |
| 2016/0288833 | A1* | 10/2016 | Heimberger ......... B62D 15/027 |

FOREIGN PATENT DOCUMENTS

| CN | 102881156 A     | 1/2013  |
| DE | 102008027692 A1 | 12/2009 |
| DE | 102013200430 A1 | 7/2014  |
| DE | 102013213379 A1 | 1/2015  |
| EP | 2316709 A2      | 5/2011  |
| JP | 2012126193 A    | 7/2012  |

OTHER PUBLICATIONS

International Search Report for PCT/EP2016/051330, dated Apr. 21, 2016.

* cited by examiner

*Primary Examiner* — Michael D Lang
(74) *Attorney, Agent, or Firm* — Norton Rose Fulbright US LLP; Gerard Messina

(57) ABSTRACT

A method for operating a vehicle, whereby the vehicle, parked at a parking position in a parking facility, is guided autonomously from the parking position to a loading station and parked autonomously at the loading station, so that the vehicle can be loaded at the loading station. Also described is a related vehicle and computer program.

11 Claims, 1 Drawing Sheet

AUTONOMOUSLY GUIDE PARKED VEHICLE TO A LOADING STATION (101)

AUTONOMOUSLY PARK VEHICLE AT LOADING STATION (103)

METHOD FOR OPERATING A VEHICLE

FIELD OF THE INVENTION

The present invention relates to a method for operating a vehicle. The invention also relates to a vehicle as well as a computer program.

BACKGROUND INFORMATION

German laid open print DE 10 2012 222 562 A1 discusses a system for managed parking areas for transferring a vehicle from a starting position to an end position.

In the case of fully automated (autonomous) so-called valet parking, a vehicle is parked by its driver at a drop-off location, for example, in front of a parking garage, and from there, the vehicle drives on its own into a parking position/parking space, and back again to the drop-off location.

If a parked vehicle is to be loaded, this may represent a degree of complexity, in that the goods must be transported to the vehicle. For example, this transport may interfere with traffic in the parking facility. In addition, the vehicle may also be parked in an area that is cordoned off for people, for instance, and is reserved only for autonomously driving vehicles. For example, it may therefore not be permissible for a person to run to the vehicle in order to load it. Critical situations may also come about if a person on the way to the parked vehicle meets autonomously driving vehicles, because interaction with a driver in order to neutralize possibly critical situations, e.g., by hand signals, is not possible.

SUMMARY OF THE INVENTION

Therefore, the object of the present invention may be seen in providing an efficient concept for operating a vehicle, by which the vehicle may be loaded safely and which overcomes the well-known disadvantages.

This objective is achieved by the respective subject matters as described herein. Advantageous developments of the invention are the subject matter of the respective further descriptions herein.

According to one aspect, a method is provided for operating a vehicle, whereby the vehicle, parked at a parking position in a parking facility, is guided autonomously from the parking position to a loading station and parked autonomously at the loading station, so that the vehicle can be loaded at the loading station.

According to a further aspect, a vehicle is provided which is equipped to carry out or implement the method for operating a vehicle.

According to another aspect, a computer program is provided which includes program code for carrying out the method for operating a vehicle when the computer program is executed on a computer.

Thus, in particular, the invention includes the idea that the vehicle is guided autonomously from its parking position to the loading station. That means, therefore, that a person himself no longer has to run to the vehicle in order to load it. Advantageously, this person thus no longer interferes with traffic in the parking facility. Notably, the loading is able to be accomplished effectively and efficiently, thereby resulting in a time savings for the person who was supposed to load the vehicle, for in the time in which the person would have to run to the vehicle in order to load it, he can take care of other things, because the vehicle drives on its own to the loading station.

A parking facility within the meaning of the present invention may also be referred to as a parking lot, and is used as parking area for vehicles. Specifically, the parking facility thus forms one coherent area which has a plurality of parking spaces (in the case of a parking facility on private property) or parking spots (in the case of a parking facility on public property). According to one specific embodiment, the parking facility may be comprised of a car park. In particular, the parking facility is comprised of a garage.

Autonomous for the purposes of the present invention means, specifically, that the vehicle navigates or drives or is guided independently in the parking facility, that is, without intervention by a driver. Hence, the vehicle drives independently in the parking facility, without a driver having to control the vehicle for that purpose. In particular, guidance includes lateral guidance and/or longitudinal guidance of the vehicle. Such an autonomously driving vehicle which is able to get into and out of a parking space automatically is known, for example, as an AVP vehicle. AVP stands for "automatic valet parking" and may be translated by "automatic parking process". Vehicles which do not have this AVP functionality are referred to as standard vehicles, for example.

According to one specific embodiment, the parking facility includes the loading station. That is to say, the loading station is thus located within the parking facility, for example.

In a further specific embodiment, the vehicle is loaded. In particular, the vehicle is loaded manually and/or automatically.

According to a further specific embodiment, after being loaded, the vehicle is guided autonomously back to the same parking position or to a different parking position in the parking facility and parked there autonomously. Namely, this provides the technical advantage that after being loaded, the vehicle no longer blocks the loading station. Because the vehicle is guided autonomously back to the same parking position or to the different parking position and parked there autonomously, this yields the special technical advantage that no undue human resources have to be utilized for this procedure.

In another specific embodiment, after a predetermined parking time has ended and/or after reception of a starting signal via a communication network, the loaded vehicle parked at the respective parking position is guided autonomously from the respective parking position to an end position in the parking facility and parked there autonomously, where the vehicle may be picked up by a person.

Notably, this yields the technical advantage that the person is able to pick up the vehicle at the end position in the parking facility. Since the vehicle is able to be picked up by the person at the end position, the end position may also be referred to as a pick-up position.

According to another specific embodiment, the vehicle is guided autonomously from a starting position in the parking facility to the parking position and parked there autonomously, before it is guided autonomously from the parking position to the loading station.

This brings about the special technical advantage that a driver of the vehicle is able to stop his vehicle at the starting position and subsequently leave the vehicle. Thus, the driver of the vehicle no longer has to see to it that the vehicle is parked at the parking position. During the time in which this autonomous parking process is carried out, the driver of the vehicle is able to take care of other things. He can therefore utilize his time efficiently and effectively.

Since the driver of the vehicle stops his vehicle at the starting position in the parking facility, so that the vehicle is subsequently guided autonomously to the parking position and parked there autonomously, the starting position may also be referred to as a drop-off position.

In one specific embodiment, the starting position is identical with the end position. In particular, that means that the driver therefore picks up his vehicle at the same location or at the same position at which he stopped his vehicle prior to the autonomous parking process.

In another specific embodiment, the starting position is different from the end position.

In one specific embodiment, the loading station is different from the starting position.

In one specific embodiment, the loading station is different from the end position.

In one specific embodiment, the loading station is different both from the starting position and from the end position.

In one specific embodiment, the starting position is located in an entry area of the parking facility.

In a further specific embodiment, the end position is located in an exit area of the parking facility.

In one specific embodiment, the entry area and the exit area of the parking facility at least partially overlap. This is especially the case when the starting position and the end position are identical.

According to a further specific embodiment, the vehicle is not guided autonomously to the loading station until a corresponding request signal is received via a communication network.

In particular, this results in the technical advantage that the instant at which the vehicle is to drive to the loading station is able to be determined, because the vehicle is first guided autonomously to the loading station in response to the reception of a corresponding request signal.

In one specific embodiment, the communication network includes a WLAN network and/or a cellular network.

According to a further specific embodiment, communication via the communication network is encrypted.

In another specific embodiment, the request signal is received by the vehicle and/or by a parking-facility server for the coordination of autonomous travel of vehicles in the parking facility.

That means, for example, that the vehicle thus receives the request signal via the communication network. In response to its reception, the vehicle then drives autonomously to the loading station, for example.

In particular, that means that the parking-facility server thus receives the request signal via the communication network. In response to its reception, the parking-facility server may coordinate the autonomous travel of the vehicle from the parking position to the loading station.

That is to say, according to one specific embodiment, in response to the reception of the request signal, the parking-facility server thus coordinates an autonomous guidance of the vehicle from the parking position to the loading station.

In particular, the provision of such a parking-facility server has the technical advantage of permitting an especially effective and efficient guidance of the vehicle, inasmuch as, as a rule, the parking-facility server has better and greater knowledge about traffic in the parking facility than the vehicle itself or a person who has sent the request signal.

According to a further specific embodiment, the autonomous guidance of the vehicle includes remote-controlled guidance of the vehicle.

That is, in particular, the vehicle is thus remotely controlled. Therefore, the vehicle itself no longer necessarily has to have knowledge about an infrastructure of the parking facility, in order to navigate to the loading station or to the parking position or to the end position. For instance, the parking-facility server which guides or coordinates the vehicle by remote control has the knowledge. Therefore, vehicles which are unable to navigate autonomously on their own in a parking facility without external help, are nevertheless able to be guided autonomously to the individual positions.

According to a further specific embodiment, the autonomous guidance of the vehicle includes control of a lateral guidance and/or longitudinal guidance of the vehicle with the aid of an in-vehicle control device. That is, in this specific embodiment, the vehicle is thus controlled or guided with the aid of the in-vehicle control device. In doing this, for example, the in-vehicle control device completely takes over the autonomous guidance, thus, without a remote-controlled guidance.

In one specific embodiment, the autonomous guidance of the vehicle includes both remote-controlled guidance of the vehicle and control of a lateral guidance and/or longitudinal guidance of the vehicle with the assistance of an in-vehicle control device. In particular, that means therefore that a mixed operation may be provided in which the vehicle is both guided by remote control and also guided with the assistance of the in-vehicle control device. So, for example, the vehicle is able to pull in or pull out at the various positions without external help, thus, without the remote-controlled guidance. However, in particular, travel in the parking facility to or from the individual positions is accomplished advantageously with the aid of the remote-controlled guidance.

According to a further specific embodiment, the parking facility is assigned to a department store in which articles of merchandise can be purchased, so that purchased merchandise may be loaded into the vehicle at the loading station. This provides the special technical advantage of facilitating effective and efficient loading of the vehicle with purchased articles of merchandise. So, for instance, after a purchase, a driver of the vehicle is able to summon his vehicle to the loading station and load it there. Subsequently, the driver of the vehicle is advantageously able to resume his shopping, for example, while in the meantime, the vehicle is guided autonomously back again to the same parking position or to the different parking position, and parked there autonomously.

In one specific embodiment, the vehicle navigates or drives autonomously or is guided by remote control from the drop-off position to the parking position.

In a further specific embodiment, the vehicle parks autonomously in the parking position or parks by remote control.

In another specific embodiment, the vehicle gets out from the parking position autonomously or gets out by remote control.

According to a further specific embodiment, the vehicle navigates or drives autonomously or is guided by remote control from the parking position to the drop-off position.

The present invention is explained in greater detail below on the basis of exemplary embodiments.

DETAILED DESCRIPTION

Figure 1:
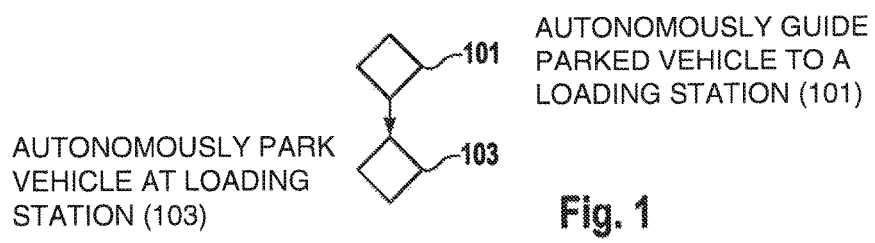
FIG. 1 shows a flowchart of a method for operating a vehicle.

FIG. 1 shows a flowchart of a method for operating a vehicle.

According to a step 101, the vehicle, parked at a parking position in a parking facility, is guided autonomously from the parking position to a loading station. According to a step 103, the vehicle is parked autonomously at the loading station. In particular, this yields the technical advantage that the vehicle is able to be loaded at the loading station.

Figure 2:
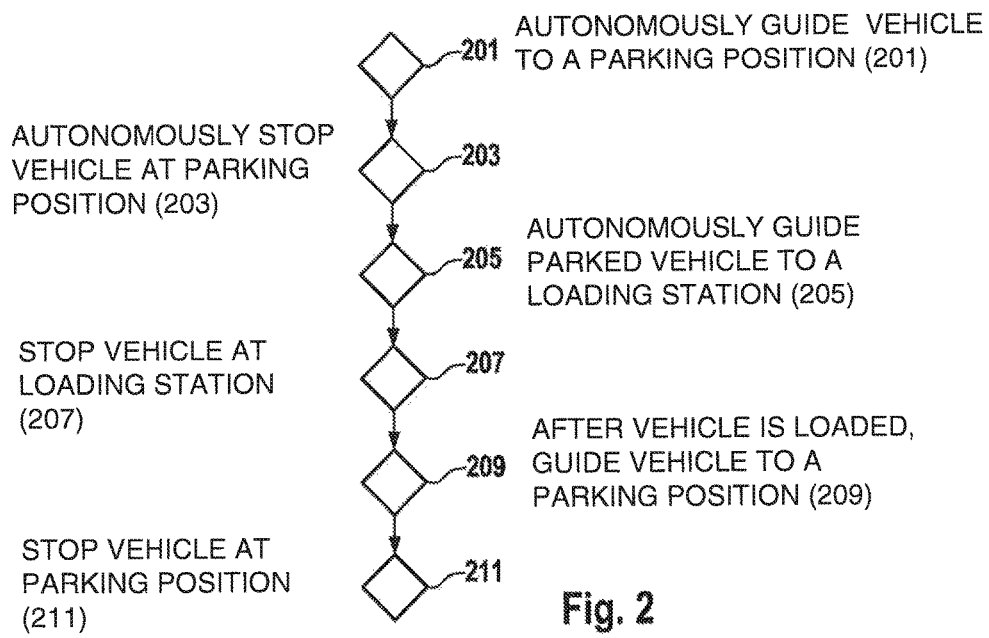
FIG. 2 shows a flowchart of a further method for operating a vehicle.

FIG. 2 shows a flowchart of a further method for operating a vehicle.

A driver of the vehicle parks his vehicle at a starting position in a parking facility. According to the method, in a step 201, the vehicle is guided autonomously from the starting position to a parking position in the parking facility. In a step 203, the vehicle is stopped autonomously at the parking position. That is, the vehicle is thus parked autonomously. This at the parking position.

In a step 205, the vehicle parked at the parking position is guided autonomously from the parking position to a loading station, and according to a step 207, is stopped there. In particular, this is accomplished autonomously, thus, the vehicle parks autonomously at the loading station.

A driver can now load the vehicle with articles of merchandise, for example, which he has purchased previously in a department store. As per the method, after it has been loaded, according to a step 209, the vehicle is then guided back to the same parking position or to a different parking position in the parking facility and, according to a step 211, is stopped there autonomously. In other words, after being loaded, the vehicle is thus parked at the same parking position or at the different parking position.

Figure 3:
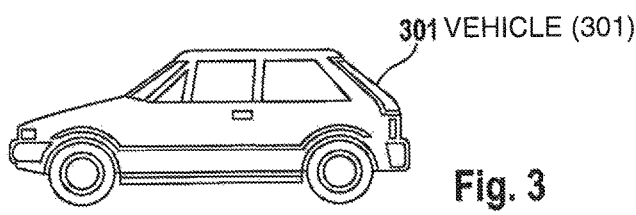
FIG. 3 shows a vehicle.

FIG. 3 shows a vehicle 301, which is equipped to implement or carry out the method for operating a vehicle.

For example, vehicle 301 includes a control device and/or guidance device which is/are configured to drive or to guide the vehicle autonomously in the parking facility. Meaning, in particular, that autonomous navigation of the vehicle in the parking facility is made possible with the aid of the control device and/or the guidance device. The guidance device and/or the control device is/are in-vehicle devices. Notably, these devices control a lateral guidance and/or longitudinal guidance of the vehicle in open loop and/or closed loop.

For example, vehicle 301 includes a driving environment sensor system for sensing a driving environment of the vehicle. In particular, vehicle 301 is controlled autonomously based on the sensed vehicle driving environment. For instance, a driving environment sensor system includes one or more of the following driving environment sensors: lidar sensor, laser sensor, video sensor, radar sensor and ultrasonic sensor.

In one specific embodiment, vehicle 301 includes a communication interface, which is configured to receive signals via a communication network. For example, such signals include remote-control signals for remote control of the vehicle. For instance, signals include request signals to the effect that the vehicle should drive autonomously from the parking position to the loading station or to the end position.

Thus, the present invention includes especially and, among other things, the idea of providing an efficient concept by which purchased goods, especially articles of merchandise, are able to be picked up automatically/autonomously during and/or after shopping or a shopping trip in a department store or in a department-store complex having an AVP parking garage/AVP parking facility. Notably, the following steps are provided individually or in combination:

In particular, the vehicle is parked fully automatically or autonomously in a department store/mall/department-store complex having a parking facility/parking garage.

In the event the driver has purchased something, according to one specific embodiment, the vehicle is summoned to a goods collection location (loading station). This either by the driver and/or by a system in the parking garage which coordinates and/or organizes the parking and the shopping (parking-facility management server).

The vehicle may drive autonomously from the parking position to the goods collection location or to the loading station.

The vehicle is loaded specifically with the goods, especially articles of merchandise. This, for example, by personnel and/or the driver.

After it has been loaded, for example, the driver accepts the vehicle at the loading station or the goods collection location.

It is provided especially that, after being loaded, the vehicle drives back again autonomously to the parking position in the parking garage or parking facility. In particular, the vehicle drives to a different parking position in the parking garage or in the parking facility.

Notably, after the vehicle has driven back to the parking position or to the different parking position, the vehicle parks there autonomously. In particular, according to one specific embodiment, at a later point in time (after the parking time has ended and/or on request by the driver), the loaded vehicle, stopped or parked at its respective parking position, drives autonomously from the parking position to a vehicle delivery location, e.g., an end position, accordingly, so that the driver is able to accept the vehicle at this position.

According to one specific embodiment, the loading process is monitored and/or documented by a monitoring system.

According to one specific embodiment, the monitoring system monitors autonomous travel of the vehicle in the parking facility. That is, for example, the monitoring system thus monitors autonomous travel of the vehicle from the starting position to the parking position, from the parking position to the loading station and back again to the parking position or to a different position, and from the parking position to an end position.

According to one specific embodiment, the monitoring system includes one or more video cameras and/or one or more radar sensors and/or one or more ultrasonic sensors and/or one or more lidar sensors and/or one or more laser sensors and/or one or more photoelectric light barriers and/or one or more door-opening sensors.

According to one specific embodiment, a route to be covered or a path to be taken by the vehicle is cordoned off or secured. In particular, this yields the technical advantage that the path to be driven is able to be deserted.

What is claimed is:
1. A method for operating a vehicle, the method comprising:
autonomously guiding the vehicle, parked at a parking position in a parking facility, from the parking position to a loading station; and
autonomously parking the vehicle at the loading station, so that the vehicle is able to be loaded at the loading station;

wherein the vehicle is guided autonomously from a starting position in the parking facility to the parking position and parked there autonomously, before it is guided autonomously from the parking position to the loading station.

2. The method of claim 1, wherein after being loaded, the vehicle is guided autonomously back to the same parking position or to a different parking position in the parking facility and parked there autonomously.

3. The method of claim 1, wherein the vehicle is not guided autonomously to the loading station until a corresponding request signal is received via a communication network.

4. The method of claim 1, wherein the autonomous guidance of the vehicle includes a remote-controlled guidance of the vehicle.

5. A method for operating a vehicle, the method comprising:
   autonomously guiding the vehicle, parked at a parking position in a parking facility, from the parking position to a loading station; and
   autonomously parking the vehicle at the loading station, so that the vehicle is able to be loaded at the loading station;
   wherein after being loaded, the vehicle is guided autonomously back to the same parking position or to a different parking position in the parking facility and parked there autonomously, and
   wherein after a predetermined parking time has ended and/or after reception of a starting signal via a communication network, the loaded vehicle parked at the respective parking position is guided autonomously from the respective parking position to an end position in the parking facility and parked there autonomously, where the vehicle is able to be picked up by a person.

6. A method for operating a vehicle, the method comprising:
   autonomously guiding the vehicle, parked at a parking position in a parking facility, from the parking position to a loading station; and
   autonomously parking the vehicle at the loading station, so that the vehicle is able to be loaded at the loading station;
   wherein the vehicle is not guided autonomously to the loading station until a corresponding request signal is received via a communication network, and
   wherein the request signal is received by at least one of the vehicle and a parking-facility server for the coordination of autonomous travel of vehicles in the parking facility.

7. The method of claim 6, wherein in response to reception of the request signal, the parking-facility server coordinates an autonomous guidance of the vehicle from the parking position to the loading station.

8. A method for operating a vehicle, the method comprising:
   autonomously guiding the vehicle, parked at a parking position in a parking facility, from the parking position to a loading station; and
   autonomously parking the vehicle at the loading station, so that the vehicle is able to be loaded at the loading station;
   wherein the autonomous guidance of the vehicle includes control of at control of at least one of a lateral guidance and a longitudinal guidance of the vehicle with an in-vehicle control device, and wherein the vehicle is guided autonomously from a starting position in the parking facility to the parking position and parked there autonomously, before it is guided autonomously from the parking position to the loading station.

9. A method for operating a vehicle, the method comprising:
   autonomously guiding the vehicle, parked at a parking position in a parking facility, from the parking position to a loading station; and
   autonomously parking the vehicle at the loading station, so that the vehicle is able to be loaded at the loading station;
   wherein the parking facility is assigned to a department store in which articles of merchandise can be purchased, so that purchased merchandise can be loaded into the vehicle at the loading station, and wherein the vehicle is guided autonomously from a starting position in the parking facility to the parking position and parked there autonomously, before it is guided autonomously from the parking position to the loading station.

10. A vehicle, comprising:
    a guiding arrangement to autonomously guide the vehicle, parked at a parking position in a parking facility, from the parking position to a loading station; and
    a parking arrangement to autonomously park the vehicle at the loading station, so that the vehicle is able to be loaded at the loading station;
    wherein the vehicle is guided autonomously from a starting position in the parking facility to the parking position and parked there autonomously, before it is guided autonomously from the parking position to the loading station.

11. A non-transitory computer readable medium having a computer program, which is executable by a processor, comprising:
    a program code arrangement having program code for operating a vehicle, by performing the following:
      autonomously guiding the vehicle, parked at a parking position in a parking facility, from the parking position to a loading station; and
      autonomously parking the vehicle at the loading station, so that the vehicle is able to be loaded at the loading station;
      wherein the vehicle is guided autonomously from a starting position in the parking facility to the parking position and parked there autonomously, before it is guided autonomously from the parking position to the loading station.

* * * * *